United States Patent

Willhite et al.

[15] 3,654,691
[45] Apr. 11, 1972

[54] PROCESS FOR CONSTRUCTING PRESTRESSED CONDUIT FOR HEATED FLUIDS

[72] Inventors: Glen Paul Willhite; William L. Martin, both of Ponca City, Okla.

[73] Assignee: Continental Oil Company, Ponca City, Okla.

[22] Filed: Oct. 20, 1969

[21] Appl. No.: 871,239

Related U.S. Application Data

[62] Division of Ser. No. 525,573, Feb. 7, 1966, Pat. No. 3,511,282.

[52] U.S. Cl. .......................... 29/446, 29/455, 29/472.1, 285/138
[51] Int. Cl. ........................................................ B23p 11/02
[58] Field of Search .................. 29/455, 446, 471.1, 472.1, 29/473.3, 474.3; 285/114, 138

[56] References Cited

UNITED STATES PATENTS

| | | | |
|---|---|---|---|
| 2,696,835 | 12/1954 | Kaiser | 138/113 X |
| 2,819,761 | 1/1958 | Popham et al. | 166/39 |
| 2,923,650 | 2/1960 | Seine | 138/149 |
| 2,924,245 | 2/1960 | Wilson | 29/455 X |
| 2,930,407 | 3/1960 | Conley et al. | 138/149 X |
| 3,065,768 | 11/1962 | Delsea | 138/113 X |
| 3,169,576 | 2/1965 | Lee et al. | 138/113 X |
| 3,213,889 | 10/1965 | Cotman | 138/149 X |
| 3,250,297 | 5/1966 | Mooneyharn | 138/113 |
| 3,388,724 | 6/1968 | Mowell et al. | 138/149 |
| 3,397,720 | 8/1968 | Jones | 138/149 |

*Primary Examiner*—John F. Campbell
*Assistant Examiner*—Richard Bernard Lazarus
*Attorney*—Joseph C. Kotarski, Henry W. Huth, Jerome B. Peterson and Gerald L. Floyd

[57] ABSTRACT

A process for constructing conduits of at least 30 feet in length within a conduit of a similar length wherein both conduits are joined in prestress.

9 Claims, 5 Drawing Figures

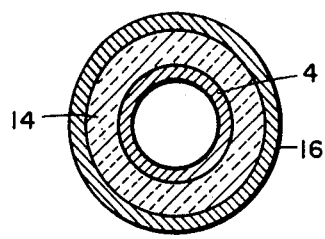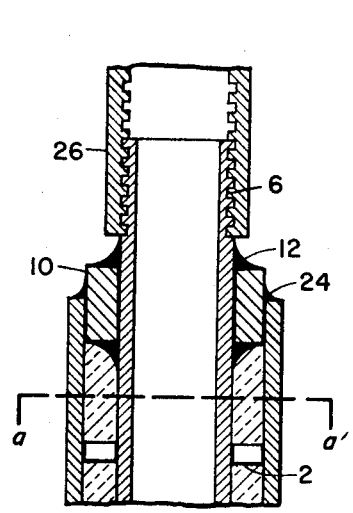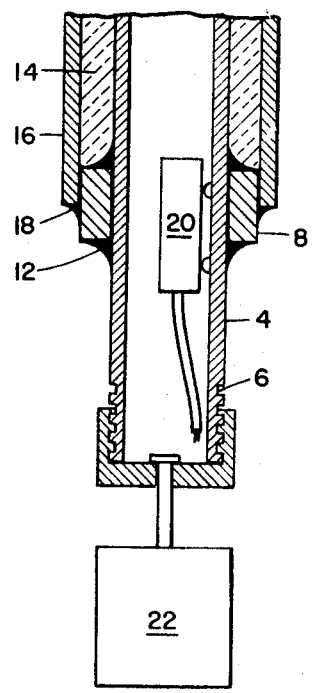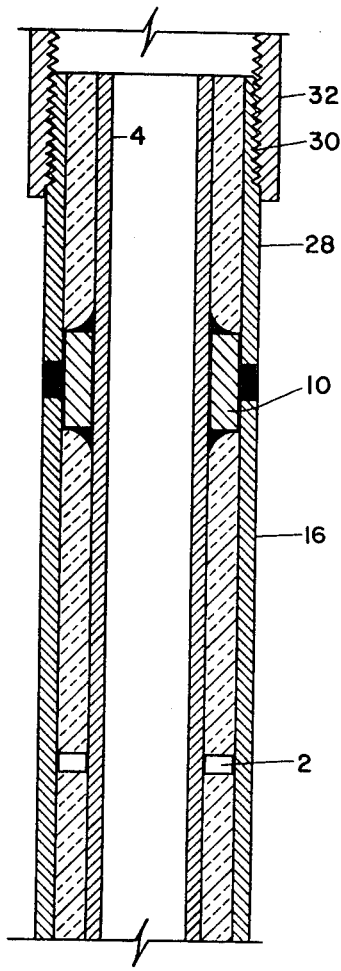
FIG. 2
FIG. 1
FIG. 3
INVENTORS
GLEN PAUL WILLHITE
WILLIAM L. MARTIN
BY
Gerald L. Floyd
ATTORNEY

PROCESS FOR CONSTRUCTING PRESTRESSED CONDUIT FOR HEATED FLUIDS

This is a division of my application Ser. No. 525,573, filed Feb. 7, 1966 and now U.S. Pat. No. 3,511,282.

This invention relates to transporting heated fluids through conduits. More particularly, it relates to apparatus and methods for carrying heated fluids through conduits in a manner so as to minimize damage to the conduit and its environment by heat.

It is oftentimes desirable to move a heated fluid through a conduit, such as a pipeline, subterranean well or the like. For example, in well producing and treating operations there oftentimes exists a high temperature differential between the formation surrounding the wellbore and the fluid being passed through conduits extending into the borehole. Such conditions exist where well treating fluids are heated before being introduced down the well or formation fluids are produced from deep zones of relatively high temperature compared with uphole conditions. It is generally desired to maintain heat transfer as low as possible to avoid dissipation of heat from heated treating fluids or rapid cooling of produced fluids. The latter cooling can cause a rapid increase in fluid viscosity making it more difficult to move the fluid, or promote precipitation of certain fluid constituents such as paraffin. High heat transfer can result in heat damage to various elements in the well environment.

Such temperature differentials are usually set up only after the conduit has been assembled and positioned. When the heated fluid is passed through the conduit, the conduit will tend to expand. As the conduit may be several thousand feet in length, the elongation resulting from this expansion will have an appreciable effect on the overall length of the conduit. For example, when steam is injected down tubing in treating a well where the tubing is rigidly positioned at the bottom of the well, the tubing will rise several feet at the surface. When special packing glands are installed around the tubing at the wellhead to allow such expansion, they are often difficult to maintain and tend to leak. If the tubing is not allowed to expand in some manner, it will buckle, collapse or otherwise deform.

In hot fluid transmission pipelines, it has been proposed to elongate a fluid conductor metal pipe to a length corresponding to that it would occupy at the hot fluid transmitting temperature and secure the elongated pipe to rigid compression taking means fixedly secured at longitudinally spaced points to prevent retraction of the conductor pipe at lower temperatures.

The compression taking means may be either a concentrically disposed metal pipe of larger diameter than the fluid conductor pipe or a concrete sheath. Sections of prestressed assemblies made up, as described, are welded together to form the pipeline. For high temperature operations, >300° F., cement undergoes strength retrogration and would fail as a compression member within a relatively short time. Also, the density of a cement sheath is relatively high and would be undesirable for certain applications, e.g., where the hot fluid transmission pipeline is to be hung in a well where excess weight in the conduit system is undesirable. Also, welding sections of the pipeline together is not practical for some applications, e.g., where the pipeline is to be repeatedly run into and out of a subterranean well. Perhaps the most important deficiency for use under ultra high temperature conditions is the lack of sufficient internal support in the assembly to withstand the stresses developed in fabrication and under actual operating conditions. Previous experiences have been with transporting molten sulfur at a temperature of about 320° F. Of particular importance in our invention are conduits for ultra high temperature fluids having temperatures in the range of 400° to 1,000° F., such as steam. We have found that these previously-known prestressed conduit systems and techniques are unsatisfactory with such ultra high-temperature fluids due to bucking, bowing and other deformation of the rigid compression-taking means after elongation when the conductor pipe returns to a lower temperature.

In cased wells there is the further problem of damage by heat to the casing and the cement sheath bonding the casing to the borehole wall. The heated metal casing cannot expand or elongate because it is bonded to the borehole wall by the cement sheath. Thus compressive stresses are generated which, at high temperatures of about 400° F. or higher, cause the casing to permanently yield in compression and shorten when cooled. When the heated fluid ceases to flow through the tubing, the casing cools off to the temperature of the adjacent formation. As the casing cools it attempts to shrink still further. The primary failure mechanism is failure in tension by pull out of the joints holding the sections of casing together. The high temperature environment also causes cracking and strength retrogration of the cement sheath. The overall result is establishment of undesirable communication between the annulus and the formation at various points throughout the length of the well allowing fluids to leak into the annulus from the formation, or vice versa.

It is an object of this invention to provide an apparatus and method of constructing same for conveying heated fluids. It is another object to provide such apparatus and method wherein damage by heat transfer from the heated fluid to the conduit and its environment is decreased. It is a further object to provide such a conduit which expands not at all or only slightly in length during heating, but does not deform. It is a still further object to provide such a conduit which is portable. It is a still further object to provide improved insulation for conduits conveying heated fluids. It is an additional object to provide an apparatus for injecting steam or other heated fluids down a cased well into a subterranean formation without damage by heat to the well equipment. It is an additional object to construct such apparatus in small sections which can later be assembled to form the conduit. It is an additional object to complete construction of such apparatus only after the conduit has been positioned for use. These and related objects, advantages and features will be realized from the following description read in conjunction with the drawings and claims.

The foregoing and similar objects may be achieved by an apparatus and method of constructing the same for conveying heated fluids in conduits without appreciable damage to the or its environment comprising a fluid conductor tubing means, a larger diameter tubing means positioned around the fluid conductor tubing means, one or more support elements positioned in the annular space between the two tubing means to hold the same in spaced concentric relationship to each other, means for elongating the fluid conductor tubing means, and means for fixedly attaching the fluid conductor tubing means to the surrounding larger diameter tubing means while said elongation is maintained so that when the elongation means is removed the fluid conductor tubing is in tension prestress.

FIG. 2 is an end elevation taken along cutting plane line a—a of FIG. 1.

FIG. 3 is a longitudinal sectional view of the conduit assembly constructed in accordance with a second embodiment of this invention.

FIG. 4 is a diagrammatic view in vertical section of a subterranean formation penetrated by a well equipped with one form of the conduit assembly of this invention.

FIG. 5 is a diagrammatic view in vertical section of subterranean formation penetrated by a well equipped with another form of the conduit assembly of this invention wherein prestress is applied only after positioning each separate tubing string in the hole.

Figure 1:
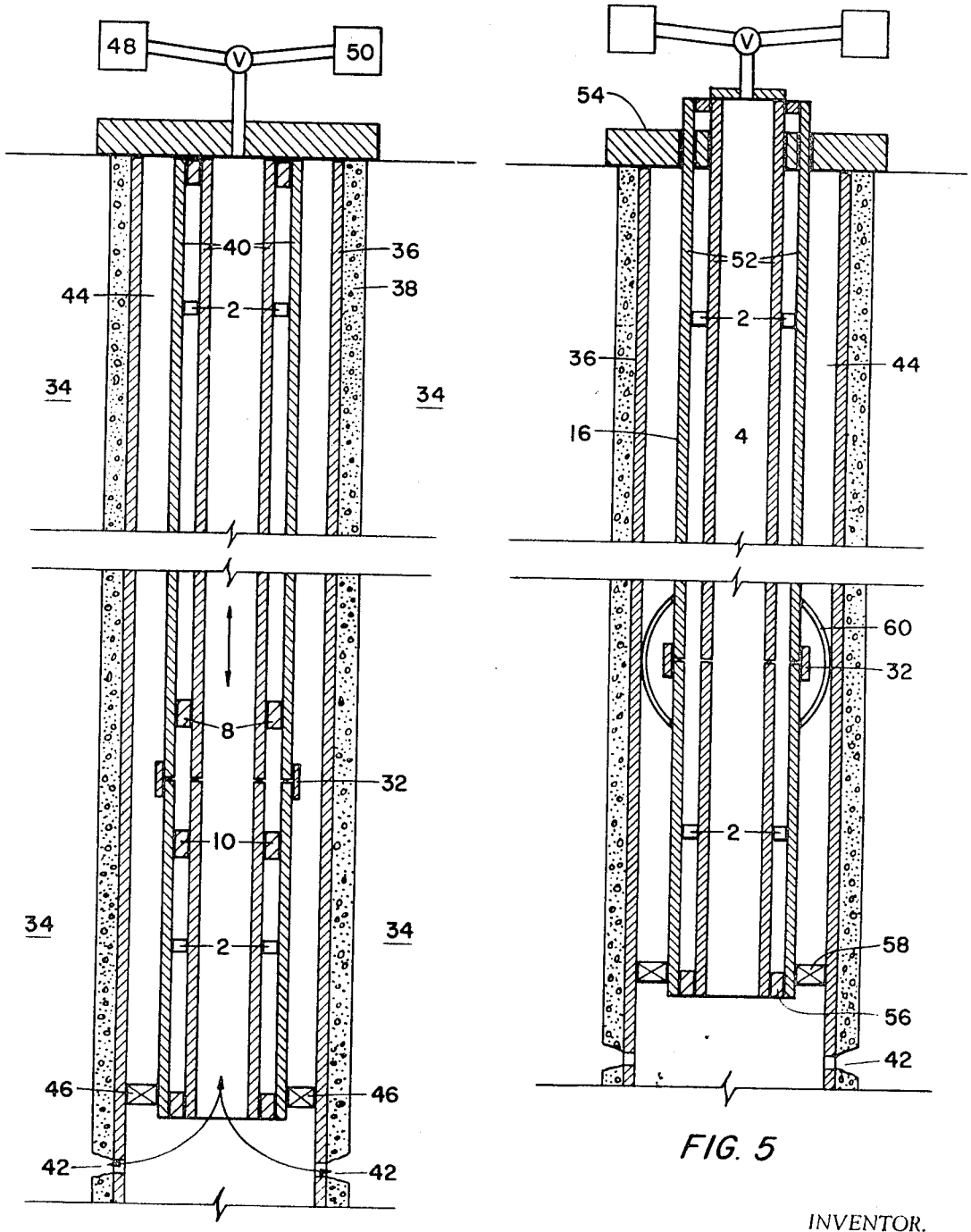
FIG. 1 is a longitudinal sectional view of the conduit assembly constructed in accordance with one embodiment of this invention.

The invention is better understood by reference to the drawings. FIG. 2 shows one embodiment of the invention in which one or more supports 2 are positioned at spaced intervals around fluid conductor tubing means 4 having external threads 6 on each end thereof. Bushings 8 and 10 are positioned around fluid conductor tubing 4 near the end thereof and affixed thereto by welds 12. Commercial insulation 14 is wrapped around fluid conductor tubing 4. The resulting subassembly is inserted inside larger diameter tubing means 16 which is of sufficient length to partially extend over the lateral surfaces of bushings 8 and 10. Large diameter tubing means 16 is fixedly attached to bushing 8 by weld 18. Fluid conductor means 4 is then elongated as by heating the interior thereof by means of tubular electrical heater 20 while blowing air past the heater with a fan (not shown) or by mechanically pulling on one end of fluid conductor means 4, as by using hydraulic jack 22, while holding the other end of fluid conductor means 4 in a fixed position. When the desired elongation has been achieved, large diameter tubing means 16 is fixedly attached to bushing 10 by weld 24. The elongation means are then removed and tension prestress develops in fluid conductor tubing means 4 as it cools. Sections of the tubing assembly so prepared are joined together by coupling means 26.

FIG. 2 shows the concentric relationship of fluid conductor tubing means 4, insulation 14 and large diameter tubing means 16 when viewed endwise along cutting plane a—a of FIG. 1.

FIG. 3 illustrates an alternate embodiment of the heated fluid tubing assembly as regards the ends thereof and the manner of joining sections together. The ends of fluid conductor means 4 are blank or not threaded. Short section 28 of larger diameter tubing section 16 is positioned around and welded to exposed lateral surface of bushing 10 following development of tension prestress in fluid conductor means 4. Short section 28 is of sufficient length so that it extends laterally as far as fluid conductor means 4 and is provided with external threads 30. Sections of tubing assembly prepared in this manner are joined together with coupling 32.

FIG. 4 shows the use of the apparatus of this invention in a well. A well penetrating subterranean formations 34 is equipped with casing 36 bonded to the borehole wall by cement sheath 38. Sections of prestressed insulated tubing assembly 40 prepared in accordance with FIG. 1 or 3 are hung in the borehole with the lower end thereof being opposite perforations 42. It is to be understood that the well could just as well be an open hole completion (not shown) as being provided with perforations. For the sake of simplicity, details of construction of tubing assembly 40 are not shown, as they are the same as illustrated in FIGS. 1 and 3. Annular space 44 between tubing assembly 40 and casing 36 may be isolated by packer means 46 or may be open at the bottom end. If no packer is employed, a gas is injected into annular space 44. Heated fluids are injected down the well via tubing assembly 40 from a source of heated fluids 48. Alternatively, heated fluids may be produced from formation 34 via perforations 42, withdrawn from the well via tubing assembly 40 and passed to storage vessel 50. Regardless of the direction of flow, the heated fluid passing through tubing assembly 40 causes relaxation of the prestress tension therein and at ultra high temperatures development of some compression, but no buckling or other deformation of tubing assembly 40. The insulation provided by tubing assembly 40 reduces or eliminates heat damage to casing 36 and cement sheath 38.

In FIG. 5, the well apparatus and function thereof are similar to that shown in FIG. 4, except that tubing assembly 52 differs in method of construction from tubing assembly 40 of FIG. 4. Tubing assembly 52 is a dual concentric injection string made up of tubing sections run into the well in any convenient order, e.g., large diameter tubing means 16 followed by fluid conductor tubing means 4, in the reverse order or both at the same time. Means are then provided to partially compensate for the expected differential expansion of dual injection string 52, especially fluid conductor tubing means 4, when a heated fluid is passed therethrough. Suitable means include a stuffing box 54 at the wellhead through which either or both members of dual injection string 52 can expand and contract and sealing device 56 at the bottom of dual injection string 52 to isolate the annulus and provide for effective insulation between the two tubing members. Suitable sealing devices 56 include a packer or a threaded plug attached to one tubing member and into which the other tubing member can be screwed. Alternatively, stuffing box 54 may be replaced by a mechanically stationary sealing device and sealing device 56 by a sealing slip joint so that the differential expansion and contraction between the two strings takes place at the bottom of dual injection string 52 while the tubing members remain in fixed position at the well-head. In a preferred embodiment, a packer or other fixed sealing device 56 is positioned in the inner annulus between the two tubing members 4 and 16 of dual injection string 52 and a mechanical hold-down 58, such as a tubing anchor is positioned in the outer annulus between dual injection string 52 and casing 36. Fluid conductor tubing 4 is then elongated to form 0.25 inch to 2.0 inches per 30-foot of length, as by mechanically pulling on the upper end thereof. Similarly, intermediate tubing string 16 may be appropriately elongated. Also, fluid conductor tubing string 4 can be caused to expand upwardly, after positioning sealing and hold-down device 56, by passing a heated fluid therethrough.

After expansion has occurred, the two tubing members are attached at their upper ends so as to maintain constant their length relationship, as with wellhead slips (not shown) conventionally used to hang strings in wells. Preferably, the inner annular space may be filled with commercial insulation or insulating fluid or partially evacuated to further reduce thermal transfer. To prevent buckling or other deformation of the elongated tubing string members 4 and 16, it is preferred to position support members 2 in the inner annulus at spaced intervals along the assembly. In still another preferred embodiment, outer annular space 44 is loaded with an inert gas with or without the use of a sealing device or mechanical holddown 58 to further reduce heat transfer between the heated fluid and casing 36. In still another preferred embodiment, sealing device 58 can be dispensed with entirely and prestress effected within the limits afforded by centralizing means 60 which can be spaced at each collar of each string. Under these conditions, it may be desirable to provide for some amount of differential expansion during the heat injection at sealing means 56 or 54. In the absence of sealing means 58, a high pressure gas must be used to prevent steam or hot fluids rising into annulus 44, as previously described.

The fluid conductor tubing means and the larger diameter tubing means differ only in that the former has a smaller diameter than the latter so that they may be positioned concentrically with an annular space therebetween. The material of construction of these two members may be the same or different, and may be selected from a wide variety of conduit means which can be used in transporting heated aqueous or oil-base fluids. Included are metal conduits such as API J55, N80. S95 and P110 steel oil field tubing, copper, admiralty, monel, brass, bronze, and the like.

The annular space between the fluid conductor tubing means and the larger diameter tubing means may be filled with air or other inert gas, filled with commercial insulation or partially evacuated to cut down heat transfer between the two tubing means. As described above, the outer annular space between the large diameter tubing and the casing may be packed off at the lower end or left open. If left open, a particularly desirable embodiment involves injection therein of an inert gas such as air, nitrogen, carbon dioxide, hydrocarbon vapors, hydrocarbon derivative vapors or any material existing in the gaseous state at the conditions of the outer annulus. This gas depresses the liquid level of any formation liquid which would normally stand in the annulus to the bottom of the tubing assembly. This gas-filled outer annular space provides additional insulation to the casing and prevents formation of high heat transfer steam on the casing either from boiling aqueous base formation fluids, or by refluxing from the steam injected. It is especially preferred to continuously infect this gas at a low flow rate while passing heated fluids through the tubing to depress the boiling level of liquid in the borehole to the lower portion of the tubing string.

Fluid conduits are generally made up by connecting together sections of conduits having appreciable length. It was found in preparing tubing assemblies from such conduit sections that it was necessary to provide internal support, i.e., to employ strength members, support or prop elements, generally doughnut shaped, at intervals in the annular space between the prestressed fluid conductor tubing means and the larger diameter tubing means. These supports occupy the annular space between the two tubing means over a short interval of length to maintain the spaced relationship of the two tubing means and prevent buckling, bowing, or other deformation during the latter stages of fabrication when the stress of elongation is applied. These supports also prevent the tubing means from bowing or buckling after the prestress is relieved when heated fluids passing through the fluid conductor tubing cause this member to go into compression. The number of support elements required necessarily varies with the temperature differential, $\Delta T$, between the heated fluid and its environment, materials of construction, and length of tubing section. As is shown by the examples below, from one to three ½-inch-long support elements was found satisfactory for a 30-foot long section of conduit under moderately high prestress. The number of supports required can be calculated from standard columnar buckling formulas. The material of construction of these support elements may be the same as that for the conduit or may be any material of considerable compressive strength, such as a hard-pressed heavy board made from a mixture of asbestos and portland cement.

The means for fixedly attaching the fluid conductor tubing means to the larger diameter tubing means may be any means which will maintain the relative position and the seal between these two tubing means after development of the prestress tension. Such means normally consists of welding both strings to the bushing used to separate them.

Insulation, if used in the annulus between the two tubing strings, may be any commercially available material such as block or loose-fill solid insulation or a high viscosity liquid. Specific examples of suitable insulation include asbestos, expanded vermiculite, calcium silicate, diatomite, expanded perlite, a mixture of 85 percent magnesium carbonate and 15 percent asbestos fiber, high viscosity crude oil, soap-thickened petroleum-base gels, non-volatile oils, high temperature hydraulic fluids, and the like. It is also contemplated to place insulation in the area of the joints used to connect sections of tubing.

To further reduce heat transfer in this annulus between the two tubing strings, the annulus may be partially evacuated as by using a vacuum pump and reflective surfaces provided on the lateral walls of the annulus to minimize heat transfer by radiation.

Assuming a borehole equipped with a 2 ⅜-inch injection tubing insulated with 0.75 inch of calcium silicate insulation and 4 ½-inch intermediate tubing, an average formation temperature of 100° F. and an average temperature of 650° F. for heated fluids flowing through the injection tubing, engineering calculations show that the ultimate temperature differential between the two tubing strings i.e., $\Delta T$, is about 500 F. Considering supports and end effects, it is estimated that an optimum design would have a $\Delta T$, of $\approx 350°0$ F. Based on a $\Delta T$ of 350° F. and yield factors for common oil field steel tubing, further calculations show that increasing the length of a 30-foot long joint of tubing, i.e., development of a differential length, $\Delta L$, of 0.81 inch produced a prestress having a satisfactory safety factor. For various practical reasons a $\Delta L$ of 0.75 inch was selected for further work. Still further calculations showed that the initial prestress on a 30-foot long section of a 2 ⅜-inch tubing elongated 0.75 inch was 38,800 p.s.i. The ultimate tension stress on an injection string made up of such sections run in a well is the sum of this initial stress, plus the stress from the weight of the injection string. This can be calculated for any length of injection string. For example, he stress for 3,500-foot injection string is 50,800 p.s.i. This leaves a safety factor in tension over the minimum yield of 80,000 p.s.i. of 1.57 which is quite satisfactory.

In handling ultra high temperature heated fluids, it is not usually possible to elongate the fluid conductor during the fabrication of the prestressed assembly to the length it will occupy at the temperature of anticipated service without using a large number of support members or exceeding the yield strength of the tubing. When the fluid conductor is used to convey hot fluids to or from a subterranean formation, the amount of prestress is also limited by the tensile load equivalent to the weight of the injection string with a reasonable safety factor. Thus, as much elongation is effected as is possible and still stay within the yield limits considering buckling, bowing and initial tension. When heated fluid is subsequently passed through such an assembly, it will elongate somewhat. However, this is a small amount of elongation compared with the elongation that would result from a non-prestressed assembly and will not result in damage to the assembly.

EXAMPLES

A 30-foot long section of a 2 ⅞-inch diameter J55 oil field tubing was positioned concentrically inside a 29-foot long section of 4 ½-inch-diameter J55 oil field tubing. One end of the resulting tubing assembly was welded to a 5-inch-diameter steel flange having a hole through the center through which one end of the 2 ⅞-inch-diameter tubing was extended a few inches and a concentric ¼-inch-deep groove on one face into which one end of the 4 ½-inch diameter tubing was fitted. A second similar flange was fitted on the other end of the assembly, but not welded. A nut was threaded onto the 2 ⅞-inch diameter tubing at the latter end and tightened against the second flange to maintain an elongation of 1 inch in the 2 ⅞-inch-diameter tubing. Measurement following cooling after elongation with an open annulus showed that the 4 ½-inch-diameter tubing bowed 1 ¼-inch off center and was thus apparently touching the 2 ⅞-inch diameter tubing at some point. This rendered the assembly useless as an insulated conduit for hot fluids.

The same section of tubing string was prepared as described above, except that three ½-inch-long supports having an inside diameter of 2.875 inches and an outside diameter of 4.025 inches were longitudinally spaced in the annulus between the two tubing sections. The supports were hard-pressed heavy board made from a mixture of asbestos and portland cement. Sections of calcium silicate insulation 0.5-inch thick were also positioned in the annulus. After elongation, no bowing damage, or failure of any part of the assembly was evident. As the insulation provided no significant support, it was evident that the three supports kept the large diameter tubing from bowing.

Two sections of insulated tubing string were individually fabricated as follows. Three ½-inch-thick doughnuts having an inside diameter of 2.41 inches and an outside diameter of 4.025 inches were placed around and spaced along a 30-foot length of 2⅜-inch diameter, type N80, oil field tubing (injection string) having externally threaded ends. Two 6-inch long bushings having an inside diameter of 2.41 inches, an outside diameter of 4.01 inches and beveled ends were placed around the 2⅜-inch diameter tubing 5½ inches from either end thereof and welded to the 2⅜-inch tubing. Four sections of 2⅜-inch inside diameter, 4-inch outside diameter, cylindrical coherent calcium silicate insulation were installed around the 2⅜-inch tubing in the area between the supports and the bushings. This assembly was forced into a 28-foot length of 4½-inch diameter J55 oil field tubing (intermediate string). One end of the 4½-inch tubing was welded to one bushing. The bushing at the other end of the assembly was scribed at the end of the 4½-inch tubing to serve as a reference point for the ¾-inch elongation to be effected. A prestress elongation of three-fourths inch in the 2⅜-inch tubing was developed by heating the interior of the 2⅜-inch tubing with a tubular electric heater while blowing air past the heater and down the interior of this tubing. After 75 minutes, the desired elongation had been obtained. While this elongation was maintained, the second bushing was centered in the 4½-inch tubing and welded thereto. The heater was shut off and removed from the 2⅜-inch tubing. The assembly was allowed to cool to room temperature whereby the desired level of prestress automatically developed in the 2⅜-inch tubing.

Two additional sections of insulated tubing assembly were fabricated, as described above, using a 2⅜-inch tubing with unthreaded ends. Following development of prestress as above, short sleeve sections of 4 ½-inch diameter tubing were welded to the exposed lateral surface of the bushing on each end of the assembly. The length of these short sections was such that they just matched the end of the 3 ⅜-inch tubing in the assembly. The outward extending ends of each short sleeve sections were externally threaded to allow joining of two sections by a coupling. Examination of each of the four assemblies revealed no bowing or other evidence of compressive stress failure in any portion thereof during fabrication or subsequent cooling.

These four sections of insulated tubing string were horizontally positioned and joined together with sleeve couplings to form an assembly approximately 120 feet long. A steam line was attached to one end of the assembly and steam at 645° F. was flowed through the 2 ⅜-inch tubing for 50 minutes. The temperature of the outside of the 4 ½-inch tubing rose from ambient temperature to 165° F. during this test. Thus, a ΔT of 480° F. was developed. Examination of the tubing assembly following the test revealed no evidence of damage or failure to any of the tubing members, welds or joints. In another test superheated steam at 750° F. was injected into the same test assembly for 10 minutes. The temperature of the outside of the 4 ½-inch tubing rose to 165° F. Thus, a ΔT of 585° F. was developed. The four joints were disconnected and examined following the test. A welding inspector found no faults in the welds. The tubing members of the string remained straight and serviceable.

While the foregoing description has been concerned mainly with the use of the heated fluid conduits of this invention in wells, it is to be understood that this apparatus may also be used in pipelines or above ground installations. The invention is not to be construed as limited to the specific constructions or arrangements of parts shown, but may be modified widely within the invention defined by the claims.

We claim:

1. A process for constructing conduits for conveying heated fluids comprising:
   a. positioning an elongated fluid conductor tubing section of at least thirty feet in length concentrically within a tubing section of larger diameter and about thirty feet in length,
   b. positioning one or more concentric support elements between the fluid conductor tubing and the larger diameter tubing, and intermediate the ends thereof to maintain the desired spacing between the fluid conductor tubing and the larger diameter,
   c. elongating the fluid-conductor tubing to the length it would occupy at a temperature of between 400° F and 1000° F while staying within the yield limits of said tubing,
   d. placing attaching means between the fluid conductor tubing and the larger diameter tubing at each end of the larger diameter tubing,
   e. fixedly attaching said attaching means to both the fluid conductor tubing and the larger diameter tubing to form a concentric tubing assembly,
   f. removing the elongating means whereby the fluid-conductor tubing remains in tension prestress and the larger diameter tubing goes into compression prestress, and
   g. joining together two or more sections of such concentric tubing assemblies to form the conduit.

2. The process of claim 1 wherein the elongation is provided by heating the fluid conductor tubing.

3. The process of claim 1 wherein the elongation is provided by mechanically stretching the fluid conductor tubing.

4. The process of claim 1 wherein the fluid conductor tubing is fixedly attached to the larger diameter tubing by welding.

5. A process for constructing insulated subsurface wellbore apparatus for conveying heated fluids comprising:
   a. positioning a section of fluid conductor tubing of at least thirty feet in length concentrically inside a section of larger diameter tubing and about thirty feet in length,
   b. positioning one or more concentric support elements in the annular space between the fluid conductor tubing and the larger diameter tubing and intermediate the ends thereof to maintain the desired spacing between the fluid conductor tubing and the larger diameter tubing,
   c. positioning a first bushing element in the annular space between the fluid conductor tubing and the larger diameter tubing near one end of the larger diameter tubing and a second bushing element in the annular space between the fluid conductor tubing and the larger diameter tubing near the other end of the larger diameter tubing,
   d. welding the first bushing element to the fluid conductor tubing and to the larger diameter tubing,
   e. welding the second bushing element to either the fluid conductor tubing or the larger diameter tubing,
   f. elongating the fluid conductor tubing to the length it would occupy at a temperature of between 400° F. and 1,000° F. while staying within the yield limits of the fluid conductor tubing, and
   g. welding the second bushing element to whichever of the fluid conductor tubing or larger diameter tubing it remained unattached in step (e) above, while the fluid conductor tubing is elongated, and
   h. removing the elongating means whereby the fluid-conductor tubing remains in tension prestress and the larger diameter tubing goes into compression prestress.

6. The process of claim 5 wherein the elongation is provided by heating the fluid conductor tubing.

7. The process of claim 5 wherein the elongation is provided by mechanically stretching the fluid conductor tubing.

8. The process of claim 5 wherein the annular space between the fluid conductor tubing and the larger diameter tubing is partially evacuated.

9. The process of claim 5 wherein the annular space between the fluid conductor tubing and the larger diameter tubing is filled with an insulation material.

* * * * *